Sept. 16, 1958     O. SCHAABER     2,851,750
CHILL MOLD

Filed Sept. 20, 1954     3 Sheets-Sheet 1

INVENTOR:
Otto Schaaber
BY
Bailey, Stephens and Huettig
ATTORNEYS

Sept. 16, 1958  O. SCHAABER  2,851,750
CHILL MOLD
Filed Sept. 20, 1954  3 Sheets-Sheet 2

INVENTOR:
Otto Schaaber
BY
Bailey, Stephens and Huettig
ATTORNEYS

Sept. 16, 1958  O. SCHAABER  2,851,750
CHILL MOLD
Filed Sept. 20, 1954  3 Sheets-Sheet 3
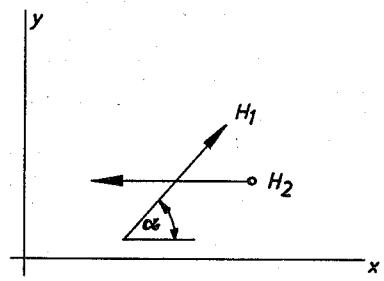
Fig. 7.
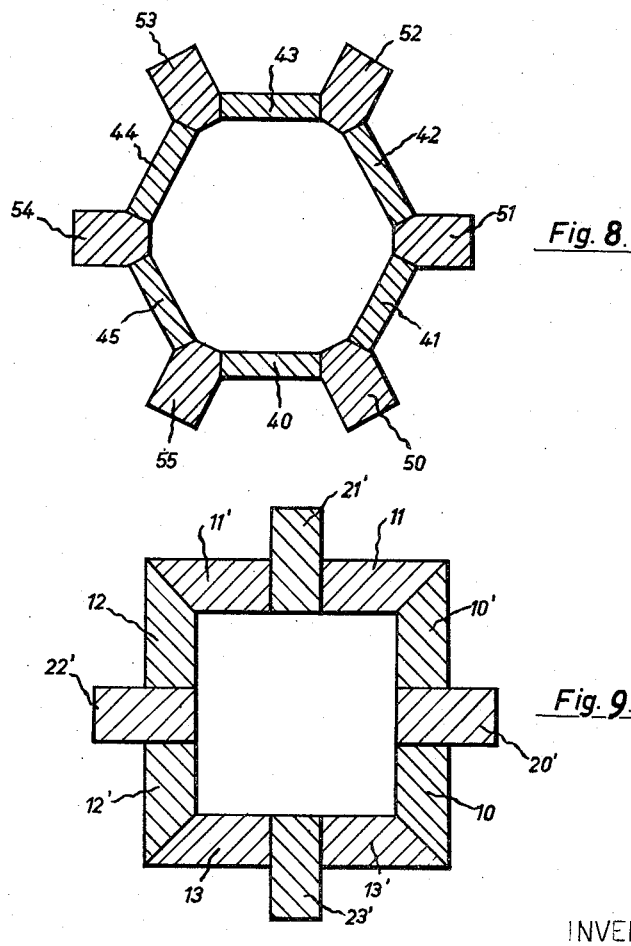
Fig. 8.
Fig. 9.
INVENTOR
Otto Schaaber
BY
Bailey, Stephens and Huettig
ATTORNEYS

United States Patent Office 2,851,750
Patented Sept. 16, 1958

2,851,750

CHILL MOLD

Otto Schaaber, Bremen, Germany

Application September 20, 1954, Serial No. 457,151

Claims priority, application Germany September 21, 1953

13 Claims. (Cl. 22—57.2)

The invention relates to a chill mold, especially for continuous casting, the shape-giving part of which is composed of separate metal parts. Whereas one-piece tubular chill molds are preferred for casting round bolts, chill molds for square and flat sections are built up from several pieces to facilitate working. The wall thickness of these parts forming the chill mold must be of a magnitude of 30 to 40 mm. for reasons of stability and to obtain tight joints.

In such composite chill molds difficulties are encountered if they are used in combination with a magnetic rotary field arrangement for the purpose of causing certain metallurgical and mechanical actions in the molten material; measurements have shown that in a cylindrical tube made of electrolytic copper with a wall thickness of 10 mm. and about 110 mm. internal diameter up to 99% of the rotary field with a frequency of technical rotary current (50 Hertz) is absorbed in the wall of the tube. Even in the case of a copper tube with a wall thickness of only 3 mm. only about 30% of the rotary field can be utilized in the interior of the tube. However, as stated, both the wall thickness of 3 mm. and also that of 10 mm. cannot be employed in the case of composite chill molds.

According to the invention, the body of the chill mold is composed of a plurality of block-shaped, prismatic or sector shaped elements, a number of which are of metals of a non-ferromagnetic character but have a high heat conducting capacity alternate with the other longitudinal parts which are connected up with the poles of the rotary field generator, are of a ferromagnetic character, the portion of the ferromagnetic longitudinal parts on the shape-giving surface of the chill mold being small as compared with the portion of the longitudinal parts with high heat conducting capacity. The chill mold can be of square cross-section and also composed of sectors fitted together to form a polygonal cross-section.

To keep the rotary current losses as low as possible while maintaining the highest possible heat conductivity, the shape-giving part of the chill mold may, according to another feature of the invention, be composed of elements, such as disks, sectors or pins, insulated from each other by non-conducting intermediate layers, oriented at right angles to the longitudinal axis of the mold and stacked transversely to this axis about which the rotary field rotates. Such heat resisting layers have been developed, for example, in the construction of transformers and dynamos, on the basis of silicates. The distribution might be carried so far that the shape-giving part of the chill mold is built up of individual wires arranged perpendicular to the axis of the chill mold but electrically insulated from each other.

Even in the case of a chill mold with square mold chamber it is possible to manage with four ferromagnetic corner parts with three iron poles in all and a corresponding time displacement of the magnetic excitation of the individual poles thru a phase angle of 120° by joining one iron pole to two neighbouring ferromagnetic corner parts by a connecting yoke. However, a considerable constructional simplification can be obtained by allowing the magnetic excitation of the longitudinal parts of the mold which act as poles to chronologically follow each other displaced thru such a phase angle that this phase angle is equal to the geometrical angle which the magnetic fields produced by the poles in question form relative to each other. In a chill mold for example of square cross-section, the corners of which are formed by longitudinal mold parts of ferromagnetic material and which preferably break or round off the square corners, the excitation of the poles is displaced thru a phase angle of 90° and, in the case of a mold of substantially hexagonal cross-section, by a corresponding phase displacement of 60° and finally, in the case of a mold with rectangular cross-section, displacement thru a phase angle which is equal to the diagonal angle of the rectangular area.

Several embodiments of the invention are illustrated by way of example in the accompanying drawings, in which:

Fig. 7 is a vector diagram explaining the building up of the magnetic fields to form a rotary field in a chill mold according to Fig. 6;

Fig. 8 shows a chill mold of substantially hexagonal cross-section, and

Fig. 9 shows a third form of construction for a chill mold of substantially square cross-section.

Figure 1:
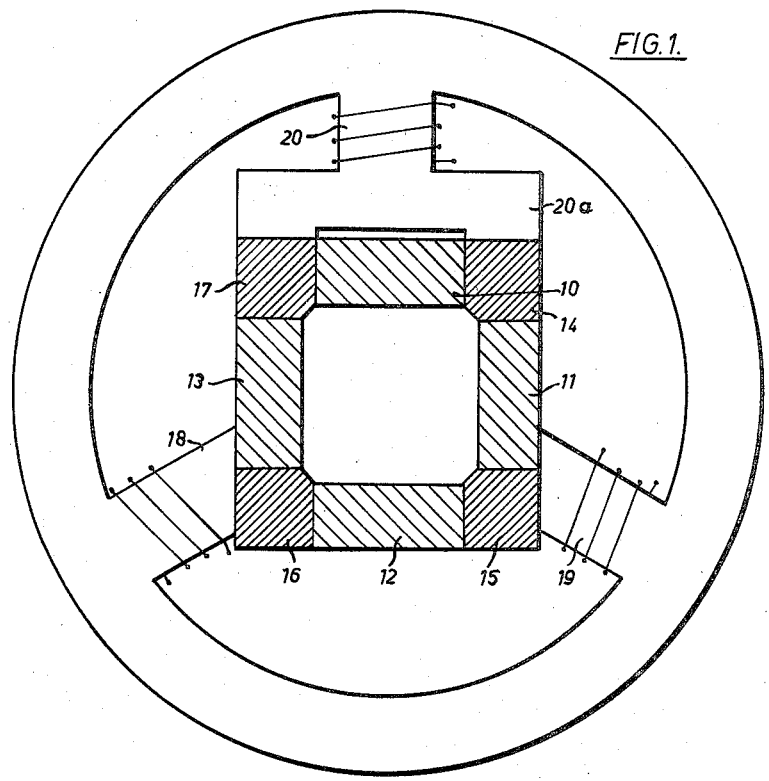
Fig. 1 shows in cross-section a rotary field chill mold built up by a pluraltiy of solid longitudinal parts.
Figure 2:
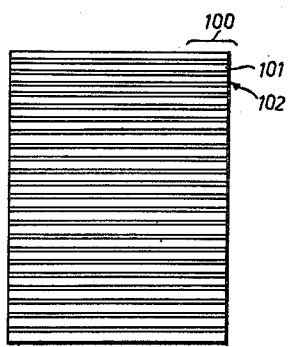
Fig. 2 is a side elevation of a laminated rotary field chill mold.
Figure 3:
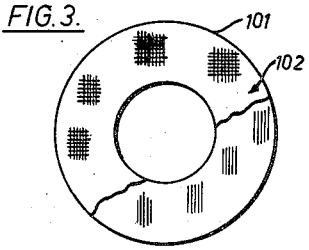
Fig. 3 shows a lamina in plan view.
Figure 4:
Fig. 4 is a section thru a lamina.

The chill mold illustrated in Fig. 1 is composed of eight longitudinal parts, the four middle parts 10, 11, 12, 13 are made of copper or brass and the four corner parts 14, 15, 16, 17 of ferromagnetic material, preferably iron.

Of the magnet poles 18, 19, 20 provided for producing the rotary field, the poles 18 and 19 each act on one of the corner parts 15 and 16 and the pole 20 acts on the two corner parts 14 and 17 thru the connecting yoke part 20a.

This arrangement possesses the advantage that the shape-giving surface of the mold is formed chiefly by the middle copper parts 10 and 13 so that therefore a good conducting off of the heat and generally a surface which is favorable for the casting operation according to experience in the art of continuous casting, is ensured also from the point of view of material.

To suppress as far as possible the formation of eddy currents in the shape-giving mold tube 100 made, for example of copper, this may be built up with laminae 101 similarly to the cores of transformers, a heat-resisting electric insulating layer 102 being used between the laminae 101. The rotary field employed must at the same time be imagined as rotating perpendicular to the axis of the cylinder, that is in the plane of the mold disks or laminae.

Figure 5:
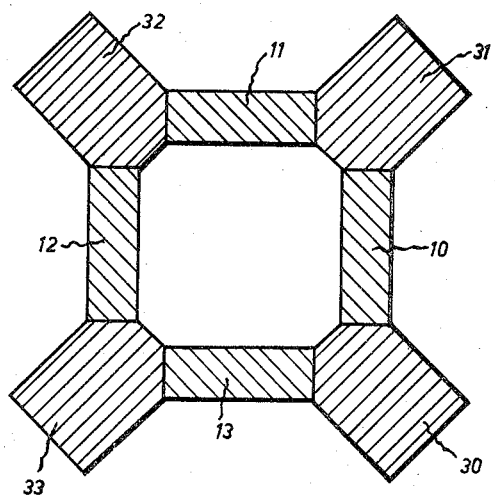
Fig. 5 shows a second form of construction for a mold of substantially square internal cross-section.
Figure 6:
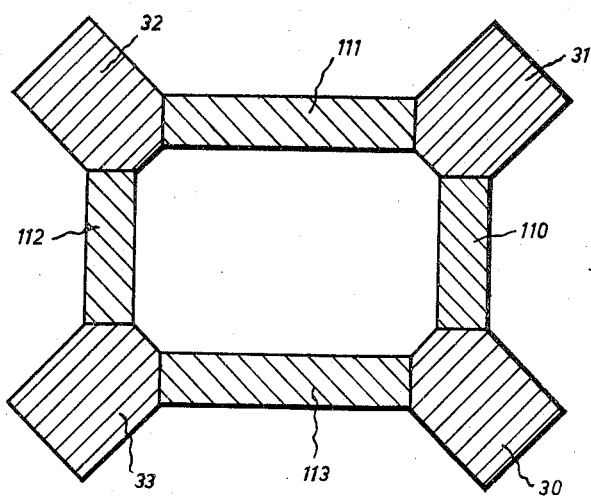
Fig. 6 shows a mold with rectangular mold cross-section.

In Figs. 5 and 6 the good heat conducting longitudinal parts 10, 11, 12 and 13 and 110, 111, 112 and 113 of the mold are made of non-ferromagnetic material, for example of copper. 30, 31, 32 and 33 are longitudinal parts of ferromagnetic material and form the poles serving for producing the rotary field in the interior space of the chill and are suitably time-displaced as regards phase. The chill mold illustrated in Fig. 5 has an internal space which is substantially of square cross-section, only broken or rounded off at the corners by the end faces of the poles 30, 31, 32, 33. The magnetic fields produced by the ferromagnetic longitudinal parts 30, 31, 32, 33 of the chill mold are mutually displaced thru an angle of 90°. Accordingly the poles are excited by four-phase current, the phase angle amounting to 90°. As the parts 30 and 32 on the one hand and 31 and 33 on the other hand produce magnetic fields of similar strengths standing one upon the other time-displaced thru an angle of 90°, a magnetic rotary field is formed in the interior space of the chill mold. Instead of speaking of 90° dephased excitation of the four longitudinal parts 30, 31, 32, 33 acting as poles, this excitation may also be regarded as current excitation displaced in each case thru 90° in pairs, when diametrically opposite poles always supplement each other in their efficiency. Therefore the excitation should be regarded as excitation by two-phase alternating current.

In the form of construction illustrated in Fig. 6, the chill mold has an internal space of substantially rectangular cross-section which is broken at the edges by the ferromagnetic parts of the chill mold arranged at the corners. The diagonals of the rectangular area defined by the cross-section of the chill mold form together an angle α. Accordingly, the diametrically opposite poles, with the object of producing the rotary field, should be excited phase-displaced thru the angle α. As can be seen from Fig. 7, two magnetic fields $$H_1 = H \cos \cot$$

and $$H_2 = -H \cos (\cot - \alpha)$$

located relatively to each other obliquely one below the other at an angle α with corresponding excitement time-dephased thru the angle α combine to form a rotary field. If, for example, in Fig. 1, the X-axis is chosen parallel to the magnetic field $H_2$ the components of the resultant magnetic field located in the X-axis and Y-axis produce $$H_x = H_1 \cos \alpha + H_2 = +H \cos \alpha \cdot \cos \cot - H \sin \alpha \sin \cot - H \cos \alpha \cdot \cos \cot = -H \sin \alpha \cdot \sin \cot$$

$$H_y = H_1 \sin \alpha = H \sin \alpha \cos \cot$$

that is, the differently phased excitation indicated leads to the formation of a rotary field of the magnitude $H \sin \alpha$.

The form of construction illustrated in Fig. 8 has a substantially hexagonal cross-section in the interior of the chill mold. The good conducting non-ferromagnetic longitudinal parts of the mold are designated by 40, 41, 42, 43, 44 and 45. The corner parts acting as poles are 50, 51, 52, 53, 54, 55.

The ferromagnetic parts 50, 51, 52 of the mold are fed relatively phase-displaced by 60°. As in the case of Fig. 5, wherein two currents mutually displace thru an angle of 90° can be employed for feeding the chill mold, which currents, supplementing each other in pairs, always excite two oppositely located shoes, the excitation of the chill shown in Fig. 8 can be effected by the phases R, S, T of an ordinary rotary current network. The feeding then takes place according to the following table:

|    | Connection | Phase angle |
|----|------------|-------------|
| 50 | R          | 0           |
| 51 | −T         | 240°+180°=60° |
| 52 | S          | 120°        |
| 53 | −R         | 180°        |
| 54 | T          | 240°        |
| 55 | −S         | 120°+180°=300° |

Between each two neighboring poles there is therefore a phase displacement of the excitation by an angle of 60°. The poles 51, 53 and 55 and also the poles 50, 52, 54 form in each case a three-phase rotary field system from which the character of the rotary field of the arrangement illustrated is derived.

In the form of construction shown in Fig. 9 the ferromagnetic mold parts 20' to 23' are arranged in the middle of the non-ferromagnetic parts 10, 10', 11, 11', so that a mold with square internal cross-section is produced.

By maintaining suitable amplitude and phase conditions between the magnetic excitations of the parts of the mold acting as poles other mold shapes can be produced which can be built up to polygonal constructions which are not rectangular.

To facilitate the flow of metal in the mold the corners of the mold can be rounded.

Although in the constructional examples discussed copper is taken as material for the good conducting longitudinal parts of the mold, it may also be advantageous to make these parts of a material which possesses a lower heat conductivity than copper but has also a relatively stronger electricity conducting capacity, as is the case, for example, with brass, and particularly the German brass alloy "MS-63," containing 63% Cu and 37% Zn, or American brass alloy known as "yellow brass" containing 65% Cu and 35% Zn, or so-called Muntz-metal containing 60% Cu and 40% Zn.

I claim:

1. In a chill mold with rotary field generator particularly for continuous casting, a shape-giving part composed of longitudinal parts, a number of said longitudinal parts made of metals of a non-ferromagnetic character but having a high heat conducting capacity, alternating with the remainder of the longitudinal parts which are connected with the poles of the rotary field generator and made of metals of ferromagnetic character, the portion of the ferromagnetic longitudinal parts on the shape-giving surface of the chill mold being small compared with the portion of the longitudinal parts with high heat conductive capacity.

2. Chill mold as set forth in claim 1, wherein the shape-giving part is a thru-flow composite tube for continuous casting.

3. Chill mold as set forth in claim 1, wherein the mold is composed of four ferromagnetic corner parts and four copper intermediate parts.

4. Chill mold as set forth in claim 1, wherein the mold is composed of four ferromagnetic corner parts and four copper intermediate parts, and of three iron poles serving for producing the rotary field, two poles being each connected to one of the four ferromagnetic corner parts of the mold whereas the third iron pole is connected to the two remaining ferromagnetic corner parts thru the intermediary of a connecting yoke.

5. Chill mold with rotary field generator as set forth in claim 1, wherein the magnetic excitation of the ferromagnetic longitudinal parts of the mold acting as poles are time displaced through such a phase angle that this phase angle is equal to the geometrical angle formed by the magnetic fields produced by the respective poles relatively to each other.

6. Chill mold as set forth in claim 1, wherein the cross-sectional shape of the mold is a regular polygon.

7. Chill mold as set forth in claim 1, wherein the cross-sectional shape of the mold is a regular polygon with rounded corners.

8. Chill mold as set forth in claim 1, wherein the hollow space in the mold is substantially of square cross-sectional shape with broken edges caused by the longitudinal parts of the molds acting as poles and the energizing of the poles takes place dephased thru an angle of 90°.

9. Chill mold as set forth in claim 1, wherein the hollow space in the mold is substantially of hexagonal cross-sectional shape and has broken corners caused by the longitudinal parts of the mold acting as pole shoes, and the energizing of the poles takes place dephased thru an angle of 60°.

10. Chill mold as set forth in claim 1, wherein the hollow space in the mold is substantially of rectangular cross-sectional shape and the poles arranged at the corners are excited relatively to each other displaced by a phase angle corresponding to the diagonal angle of the rectangle area.

11. Mold with rotary field generator, wherein the entire shape-giving part of the mold is composed of elements oriented perpendicularly to the longitudinal axis of the mold and piled transversely to this axis, these elements being insulated from each other by intermediate non-conductive layers, and rotary field means around the said axis.

12. Mold as set forth in claim 11, wherein the elements consist of disks.

13. Mold as set forth in claim 11, wherein the elements consist of sectors.

References Cited in the file of this patent

UNITED STATES PATENTS

| | | |
|---|---|---|
| 1,893,206 | Messler et al. | Jan. 3, 1933 |
| 2,400,660 | Strickland | May 21, 1946 |

FOREIGN PATENTS

| | | |
|---|---|---|
| 699,156 | Great Britain | Oct. 28, 1953 |
| 1,064,849 | France | Dec. 30, 1953 |
| 670,894 | Germany | Jan. 26, 1939 |
| 505,612 | Belgium | Sept. 29, 1951 |